United States Patent [19]
Roth et al.

[11] Patent Number: 5,377,827
[45] Date of Patent: * Jan. 3, 1995

[54] MEDIA DISK STORAGE CONTAINER WITH PRINTED PAPERBOARD SHEETS

[75] Inventors: Richard Roth; Paul D. Miller; William L. Plumb, all of New York, N.Y.

[73] Assignee: Queens Group, Inc., Long Island City, N.Y.

[ * ] Notice: The portion of the term of this patent subsequent to Feb. 8, 2011 has been disclaimed.

[21] Appl. No.: 192,829

[22] Filed: Feb. 7, 1994

Related U.S. Application Data

[63] Continuation-in-part of Ser. No. 904,342, Jun. 22, 1992, Pat. No. 5,284,242.

[51] Int. Cl.6 .............................................. B65D 85/57
[52] U.S. Cl. ..................... 206/310; 206/309; 206/312; 206/472
[58] Field of Search ............... 206/309, 310, 311, 312, 206/387, 444, 472, 313; 229/23 R

[56] References Cited

U.S. PATENT DOCUMENTS

| | | | |
|---|---|---|---|
| 2,663,416 | 12/1953 | Hirsch | 206/310 |
| 4,176,744 | 12/1979 | Borzak | 206/303 |
| 4,327,831 | 5/1982 | Inaba et al. | 206/310 |
| 4,488,645 | 12/1984 | Yamaguchi | 206/444 |
| 4,511,034 | 4/1985 | Pan | 206/310 |
| 4,535,888 | 8/1985 | Nusselder | 206/444 |
| 4,623,062 | 11/1986 | Chase et al. | 206/311 |
| 4,643,301 | 2/1987 | Hehn et al. | 206/387 |
| 4,709,812 | 12/1987 | Kosterka | 206/310 |
| 4,802,601 | 2/1989 | Pijanowski et al. | 206/387 |
| 4,874,085 | 10/1989 | Grobecker et al. | 206/309 |
| 4,895,252 | 1/1990 | Nomula et al. | 206/310 |
| 5,101,971 | 4/1992 | Grobecker | 206/232 |
| 5,188,230 | 2/1993 | O'Brien et al. | 206/312 |
| 5,201,461 | 4/1993 | Sykora | 229/23 R |
| 5,284,242 | 2/1984 | Roth et al. | 206/310 |

FOREIGN PATENT DOCUMENTS

| | | | |
|---|---|---|---|
| 1198208 | 12/1985 | Canada | 352/32.4 |
| 0022652 | 1/1981 | European Pat. Off. | |
| 0337181 | 10/1989 | European Pat. Off. | |
| 2421736 | 11/1979 | France | |
| 4124135 | 2/1992 | Germany | |
| 2091692 | 8/1982 | United Kingdom | |
| 2147262 | 5/1985 | United Kingdom | B65D 27/22 |

*Primary Examiner*—David T. Fidei
*Attorney, Agent, or Firm*—Ostrolenk, Faber, Gerb & Soffen

[57] ABSTRACT

A media disk storage container includes a lid and a base connected by a hinge, both the lid and the base having inner and outer surfaces for receiving separate sheets of printed paperboard. The outer surfaces of the lid and base are recessed to protect the paperboard sheets adhered thereto from being damaged by contact with other surfaces. The base includes a recessed spine for receiving an extension of the paperboard sheet which covers the outer surface of the base, so that identifying printed matter can be displayed on the spine. Likewise, the lid includes a recessed section along its upper sidewall for receiving an extension of the printed paperboard sheet which covers the outer surface of the lid.

16 Claims, 14 Drawing Sheets

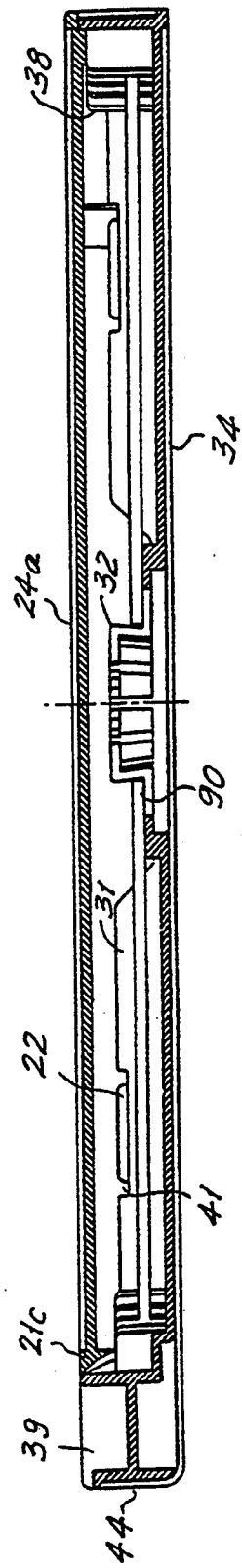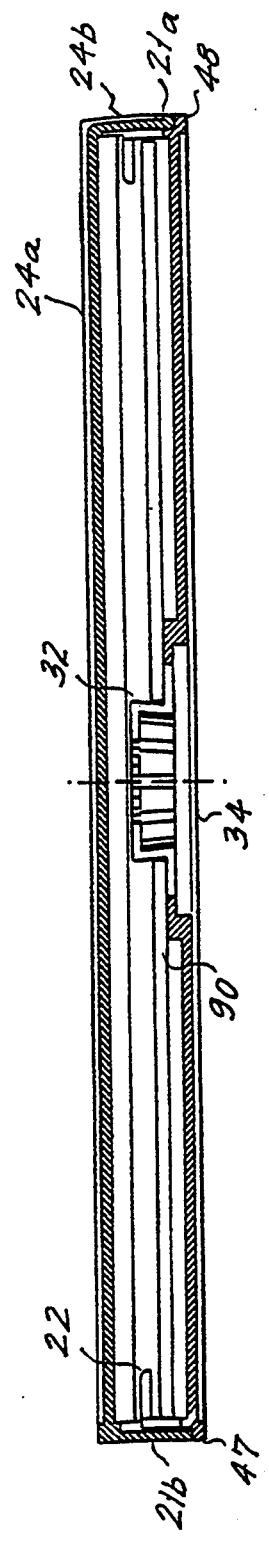
FIG. 19
FIG. 20

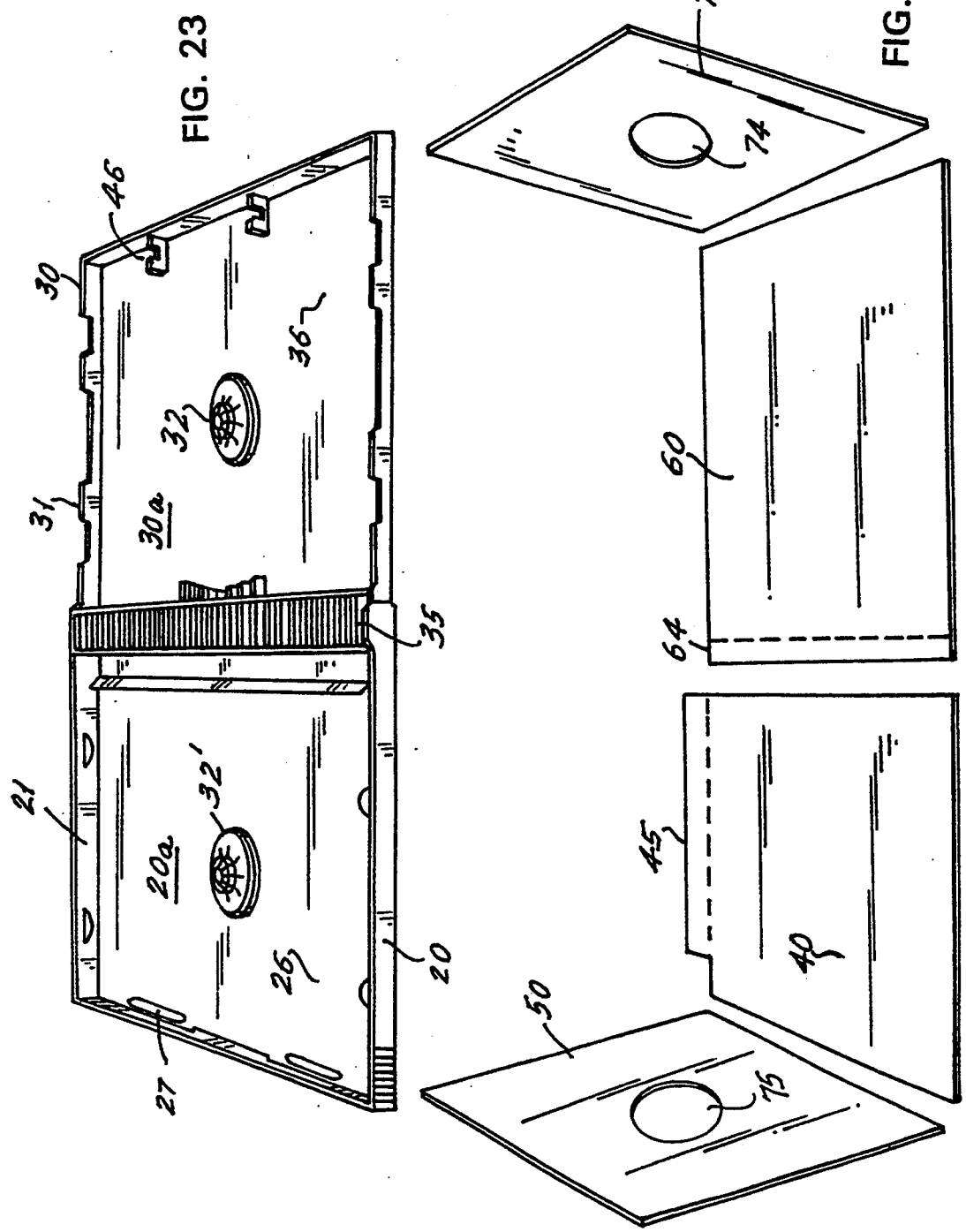

MEDIA DISK STORAGE CONTAINER WITH PRINTED PAPERBOARD SHEETS

This is a continuation-in-part of U.S. application Ser. No. 07/904,342, filed Jun. 22, 1992, now U.S. Pat. No. 5,284,242.

BACKGROUND OF THE INVENTION

1. Field of the Invention:

The present invention relates to a media disk storage container and, more particularly, to a media disk storage container provided with printed paperboard sheets forming the package surfaces. The container is particularly suited for but not limited to the storage of compact audio discs, CD ROM's and other laser-readable discs.

2. Description of the Related Art

Traditionally, "jewel boxes" have been used as containers for compact discs and the like. As shown in U.S. Pat. No. 4,874,085, the standard jewel box comprises clear plastic base and lid panels which are hingedly connected along one side. Printed promotional material is inserted in the lid and base panels that so that it is visible to the consumer. The assembled jewel box is then wrapped in a plastic film.

A disadvantage of the traditional jewel box is that the sharpness and clarity of the graphics of the printed material, which play an important role in sale and advertising, are often degraded by having to view the graphics through the plastic panels of the base and lid, due to the reflections created by light striking the plastic. Moreover, the material used to produce the jewel box is fragile, the plastic panels and hinges being easily broken if the jewel box is dropped or compressed.

A further disc storage container design, as disclosed in U.S. Pat. No. 5,188,230, utilizes nonplastic folded paperboard panels. However, the paperboard of this design is not highly durable because it is exposed along the folded edges. Moreover, the design is complex to the consumer, as the paperboard must be manipulated in the plastic container after purchase. Another disadvantage of this design is that special machinery must be used to assemble the container and load the CD and accompanying pre-printed insert.

SUMMARY OF THE INVENTION

It is an object of the present invention to provide a media disk storage container which overcomes the above-mentioned deficiencies.

The storage container of the present invention comprises a lid and a base hingedly connected together, the lid comprising a panel having an inner surface and an outer surface, and a sidewall extending at least partially around the periphery of the lid panel, the outer surface of the lid panel being recessed with respect to a peripheral edge of the lid sidewall. The base also comprises a panel having an inner and an outer surface, with a sidewall extending at least partially around the periphery of the base panel, the outer surface of the base panel being recessed with respect to a peripheral edge of the base sidewall.

A first sheet of material is adhered to the recessed outer surface of the lid, a second sheet of material is adhered to the inner surface of the lid, a third sheet of material is adhered to the recessed outer surface of the base, and a fourth sheet of material is adhered to the inner surface of the base, the first, second, third and fourth sheets of material being separate from each other. The first, second, third and fourth sheets of material are preferably comprised of paperboard with printed matter.

The base includes a recessed spine section along the hinged side and the third sheet of material includes a portion which wraps around the recessed section and is adhered therein. Likewise, the lid preferably includes a recessed section along an upper side of the lid sidewall, and the first sheet of material includes a corresponding top portion which extends from the outer surface of the lid, wraps around the upper side of the lid sidewall and is adhered within the recessed section.

The container further includes means located on the inner surface of the lid for securing a document to be included in the container, and the inner surface of the base is provided with a spindle for securing a media disk within the container. The inner surface of the lid can also optionally be provided with a spindle so that a plurality of media disks can be stored within the container.

The container can optionally be provided with concealed recesses for accommodating an anti-theft device, preferably located on the base between the outer surface thereof and the third sheet of material.

The container preferably includes support means located on the inner surface of the base for preventing damage to the container when the lid and base are compressed together. The container also preferably includes locking means for locking the base and lid together, the locking means comprising supports disposed on the inner surface of the base which mate with bosses disposed on the inner surface of the lid when the base and lid are closed together.

The container preferably includes grasping means located on both the first and second peripheral walls for enabling a user to grasp the base and lid when opening or closing the container, the grasping means comprising notched surfaces on the sidewalls of the base and lid.

Advantageously, the container of the present invention provides a media disc container having graphics which are sharp and clear since the printed paperboard sheets lie unobstructed from light reflections on the outer surfaces of the plastic lid and base panels. At the same time, the present invention is designed such that the printed paperboard sheets lie in recesses in the outer surfaces of the lid and base panels, such that they are not easily damaged from contact with other surfaces. Advantageously, the printed paperboard sheets are permanently adhered to the base and lid panels, and require no manipulation by the user after purchase. Additionally, advantageously, the container of the present invention can be loaded with the disc and graphic materials with previously existing machinery used for loading conventional jewel boxes.

Other features and advantages of the present invention will become apparent from the following description of the invention which refers to the accompanying drawings.

BRIEF DESCRIPTION OF THE DRAWINGS

FIG. 19 is a cross-section of the assembled base and lid taken along line J—J of FIG. 16.

FIG. 20 is a cross-section taken along line K—K of FIG. 16.

FIG. 23 is a perspective view of another embodiment of the container of the present invention in an open condition.

FIG. 24 is a perspective view of the paperboard sheets of the embodiment of FIG. 23.

DETAILED DESCRIPTION OF THE PREFERRED EMBODIMENTS

Figure 1:
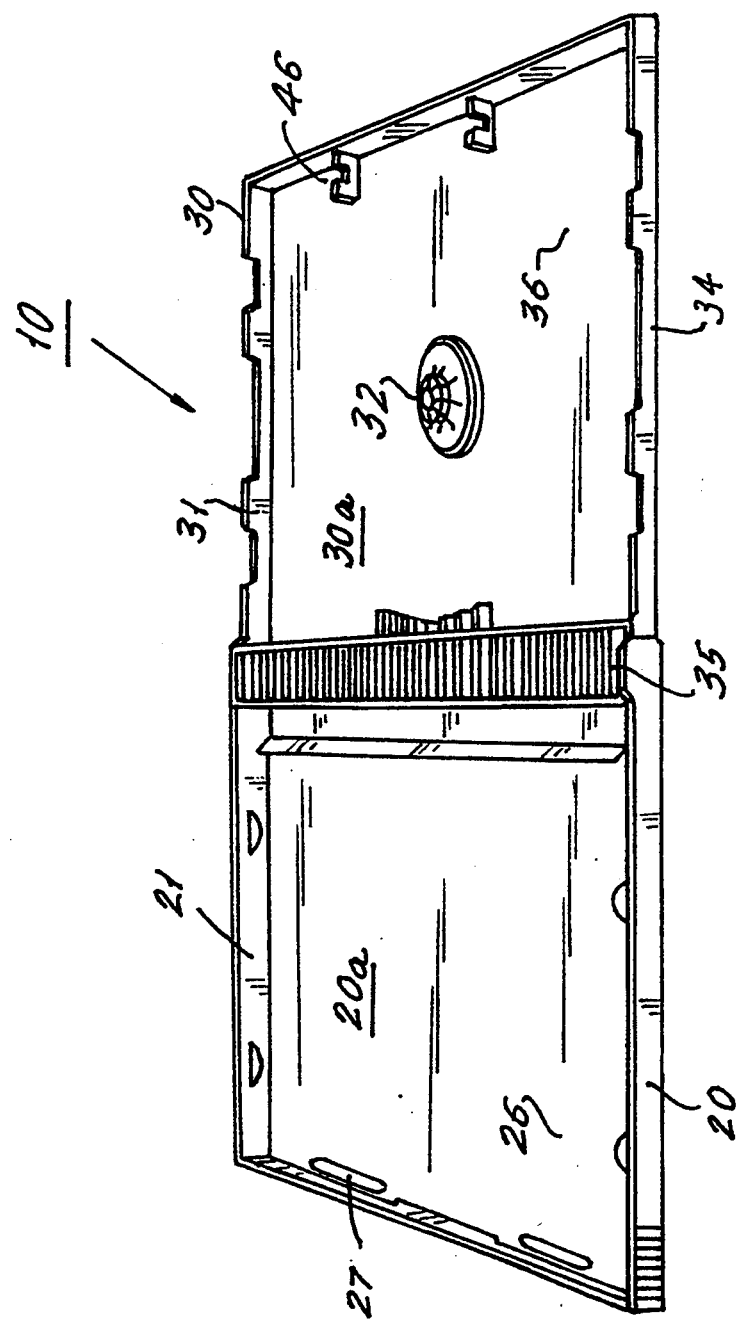
FIG. 1 is a perspective view of the container of the present invention in an open condition.

Referring to FIG. 1, the media disk storage container of the present invention comprises a lid 20 and a base 30. Lid 20 and base 30 are connected together along one side by a hinge 35. Hinge 35 can be integrally formed with the base 30 or formed separately and secured to the base or lid.

The lid and base are preferably formed of molded plastic, for example, recycled polycarbonate, polystyrene or polypropylene. The size of the lid and base, and the thickness and material of the plastic, depend upon the particular application.

Lid 20 is formed of a main panel 20a bounded by a sidewall 21 which extends around the periphery of the lid. Lid panel 20a has an inner surface 26, shown in FIG. 1, which is disposed beneath the inner edge of lid sidewall 21. Lid panel 22 also has an outer surface 24, shown in FIG. 10, which is recessed with respect to the outer edge of lid sidewall 21.

In similar fashion to lid 20, base 30 also is formed of a main panel 30a bounded by a sidewall 31 which extends around the periphery of the base. Base panel 30a has an inner surface 36, shown in FIG. 1, which is disposed beneath the inner edge of base sidewall 31. Base panel 30a also has an outer surface 34, shown in FIG. 20, which is recessed with respect to the outer edge of base sidewall 31.

Figure 2:
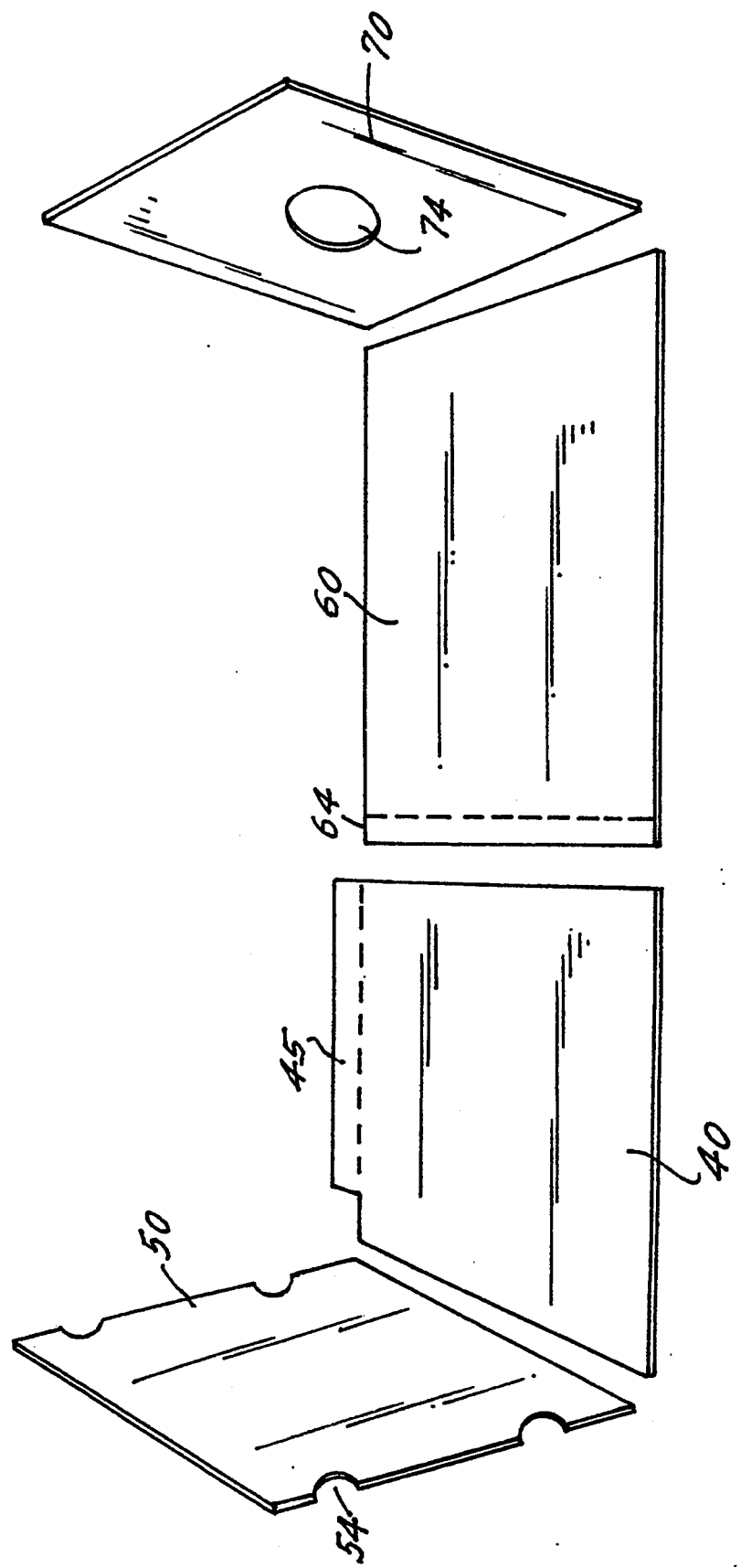
FIG. 2 is a perspective view of the paperboard sheets of the present invention.

As shown in FIG. 2, the container of the invention includes four separate, die-cut paperboard sheets 40, 50, 60 and 70, which are located in and adhered to the inner surfaces 26, 36 and outer surfaces 24, 34, respectively, of the lid and base panels 20a, 30a. Although sheets 40, 50, 60, 70 are preferably made of paperboard, they could also be made of vinyl or another appropriate material.

The recessed depths of outer surfaces 24, 34 of the lid and base panels are slightly greater than the thickness of the paperboard sheets. Thus, when the container is assembled with the sheets adhered to both sides of the base and lid panels, the outer peripheral edges of sidewalls 21, 31 of the base and lid advantageously protect the sheets on the outside of the container from being damaged due to contact with other surfaces, such as a table top or other containers when the same are stacked or stored next to each other.

As will be described further herein, the first sheet 40 of paperboard, which is adhered to the outer surface of lid 20, includes a top portion 45 which extends from the first sheet 40. Likewise, the third paperboard sheet 60 includes a spine portion 64 which extends from one side of sheet 60. The second paperboard sheet 50 includes half-moon shaped cut-outs 54 and the fourth sheet 70 includes an aperture 74 to accommodate the spindle 32 on base 30. Spindle 32 supports the media disc and can be of any desired known configuration.

All four sheets of the paperboard preferably include printed graphics thereon, illustrating for example, various recording artists, song lyrics, etc. The spine portion 64 of sheet 60 and the top portion 45 of sheet 40 can also include graphics for readily identifying the package during storage. Moreover, since the outermost surfaces of the assembled package are made of paperboard, various finishing processes, such as stamping or embossing, can be employed.

Figure 3:
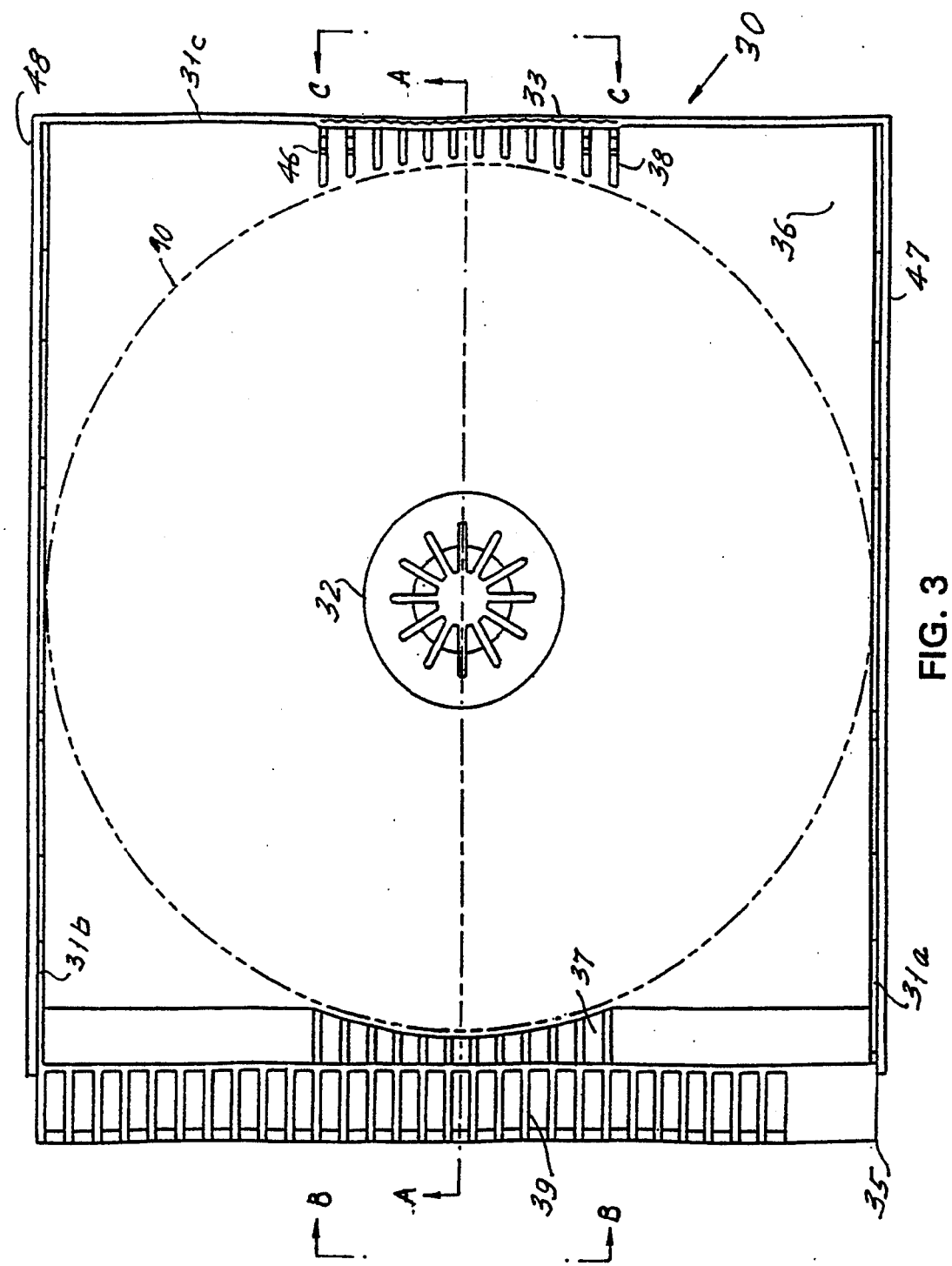
FIG. 3 is a top view of the base of the container of the present invention.

FIG. 3 is a top view of base 30, which accommodates the disc 90, shown by dashed line. Inner surface 36 of base 30 is provided with upraised support fins 37 in the vicinity of hinge 35. Base 30 also preferably includes support fins 38 located along the outer side thereof. Fins 37 and 38 protect the container, and disc enclosed therein, when the lid and base are compressed together.

As described previously, sidewall 31 of base 30 extends peripherally around the base. Sidewall 31 includes the segments 31a, 31b and 31c as shown in FIG. 3. Sidewall segments 31a and 31b are inset from the edge of the base, leaving rims 47 and 48. As previously described with respect to FIGS. 1 and 20, the inner and outer edges of sidewall 31 extend beyond the inner and outer surfaces 36 and 34 of the base panel 30a to protect the paperboard sheets adhered to those surfaces.

Figure 4:
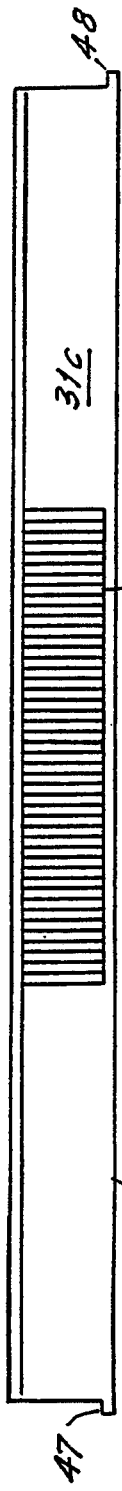
FIG. 4 is a front view of the base viewed from line C—C of FIG. 3.

FIG. 4 is a front view of base 30 taken from line C—C of FIG. 3. Sidewall segment 31c includes a notched surface 33 which helps the user to grip the base when opening and closing the container.

Figure 5:
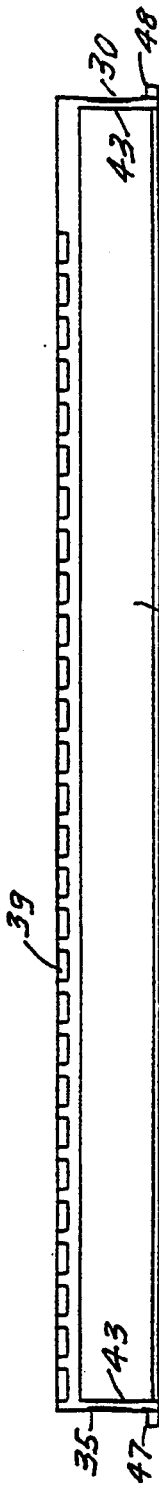
FIG. 5 is a rear view of the base viewed from line B—B of FIG. 3.

FIG. 5 is a rear view of base 30 as seen from line B—B of FIG. 3 along hinge 35. The top of hinge 35 includes a grooved area 39 which is both aesthetically pleasing to the consumer and functional as it aids in gripping the container.

As shown in FIGS. 5, 18, 19 and 22, base 30 includes a recessed spine 44. The spine portion 64 of the third paperboard sheet 60 extends from one side of the paperboard sheet, wraps around and is recessed within spine 44.

Figure 7:
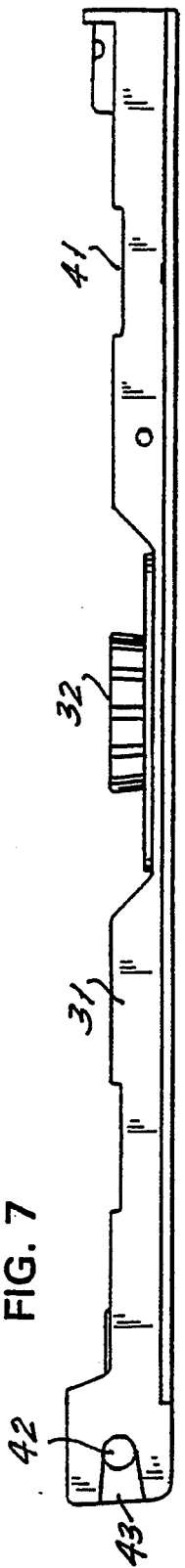
FIG. 7 is a side view of the base of the container of the present invention.
Figure 9:
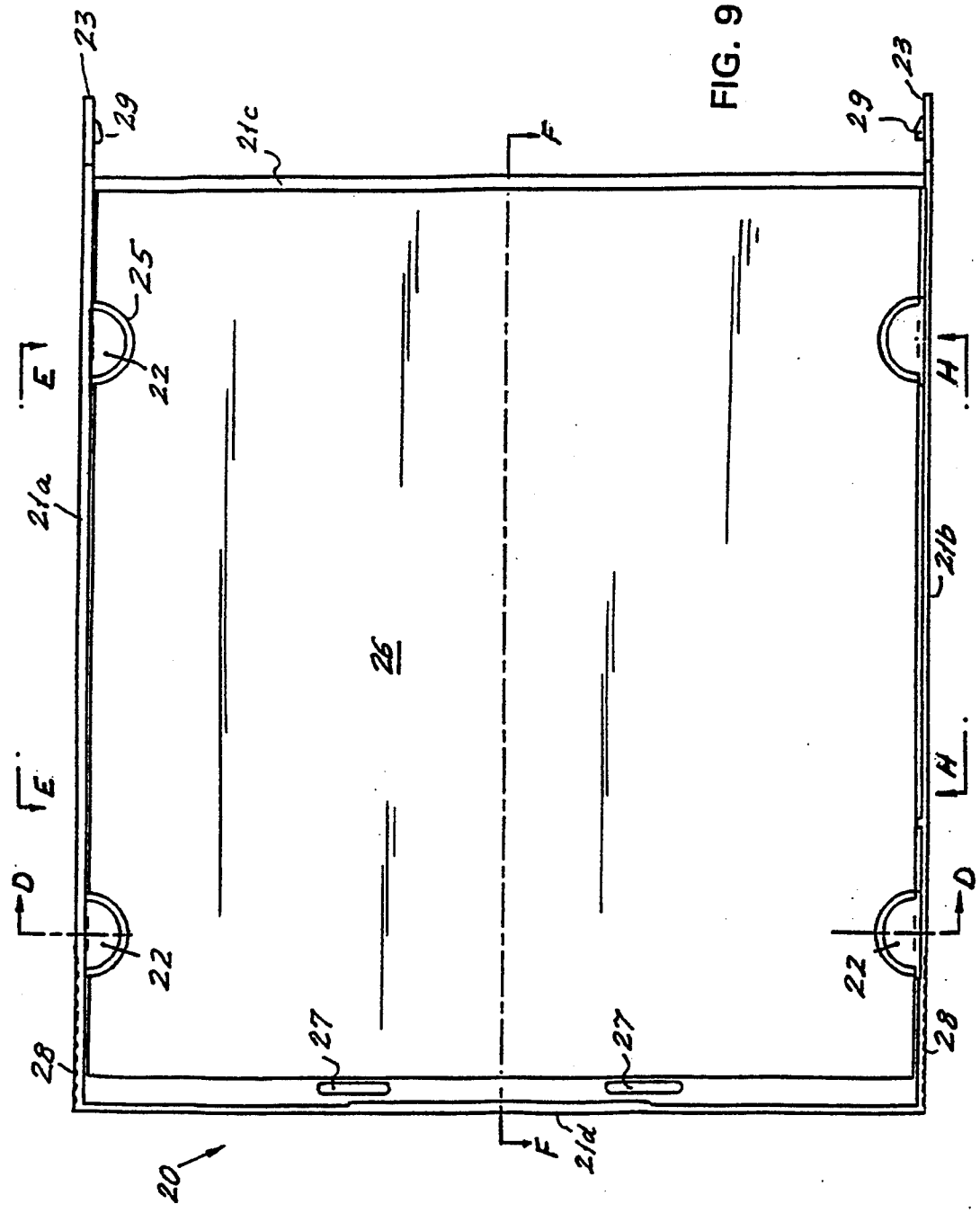
FIG. 9 is a top view of the lid of the container of the present invention.

Hinge 35 includes indents 43 on either side thereof, as well as apertures 42, as shown in FIG. 7, for accommodating pins 29 on lid 20 shown in FIG. 9.

Figure 6:
FIG. 6 is a cross-section of the base taken along line A—A of FIG. 3.

FIG. 6 is a cross-section of base 30 taken along line A—A of FIG. 3. As shown in FIG. 6, the grooved area 39 of hinge 35 extends approximately half of the height of hinge 35 to provide extra rigidity to the structure. Moreover, sidewall 31 includes cut-out portions 41 which accommodate tabs 22 located on the inner side of sidewall 21 (see FIG. 9) when the lid and base are closed.

As shown in FIGS. 1, 3, and 7, base 30 includes a U-shaped latch part 46 which accommodates latch bosses 27 of lid 20, when the lid and base are closed. As shown in FIG. 3, the U-shaped latch part 46 can be accommodated in the support fins 38 or located independently as shown in FIG. 1.

Figure 8:
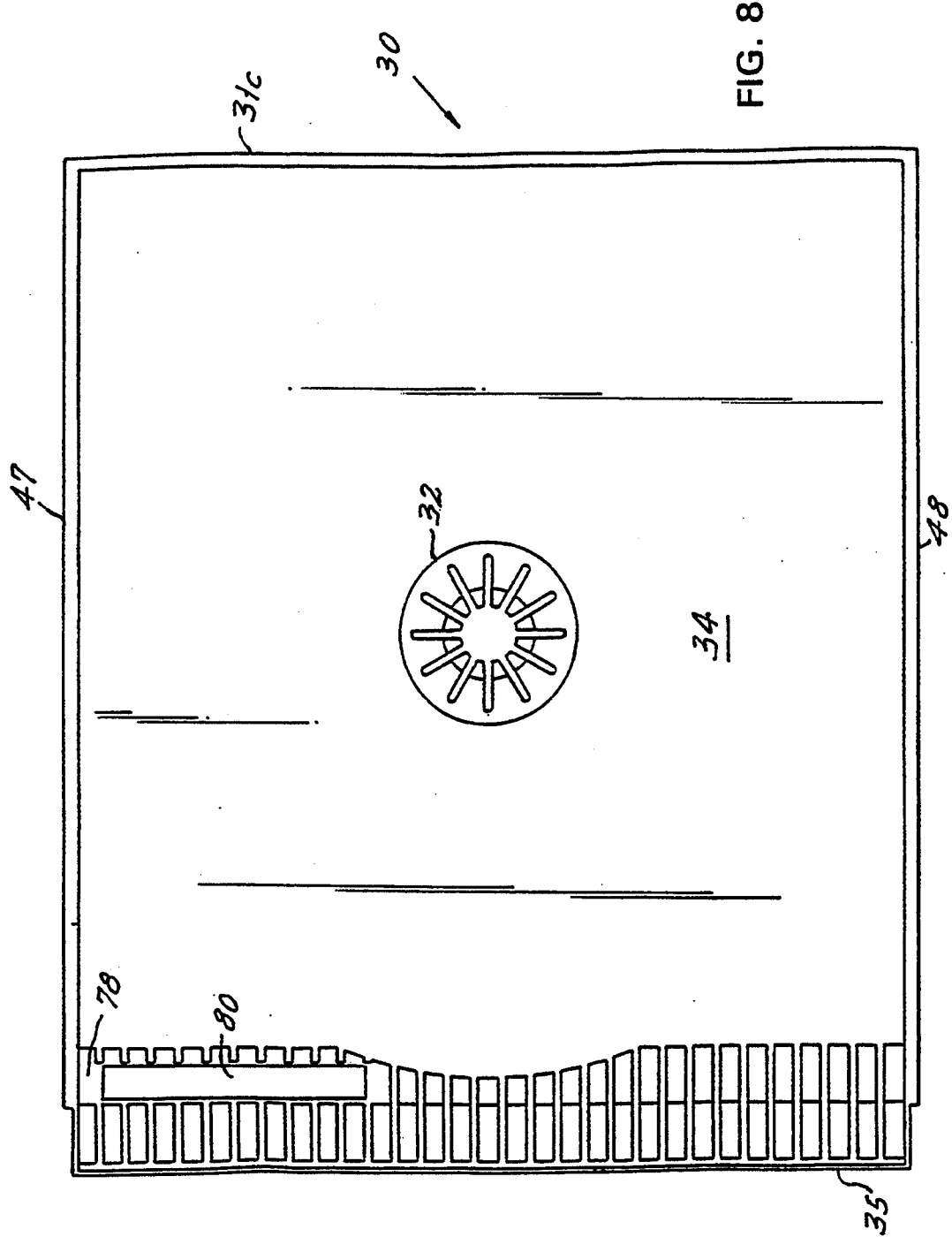
FIG. 8 is a bottom view of the base of the container.

FIG. 8 is a bottom view of base 30. An anti-theft device 80 can be located within a concealed recess 78 in base 30 in the vicinity of hinge 35. The device 80 is designed to be covered by the third sheet 60 of the paperboard when the same is adhered to the outer 34 of base 30. The anti-theft device 80 can be comprised of an electronic article surveillance tag (EAS tag) such as an electronic chip or magnetic device, designed to be deactivated at the time of purchase.

Figure 17:
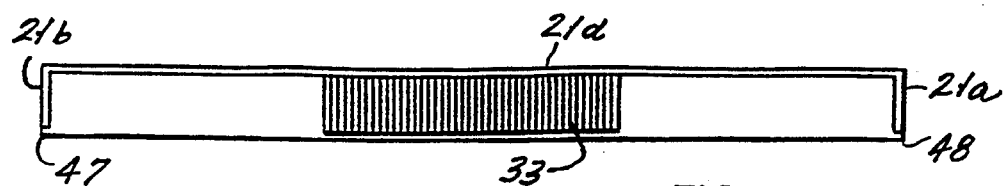
FIG. 17 is a front view of the assembled base and lid.
Figure 21:
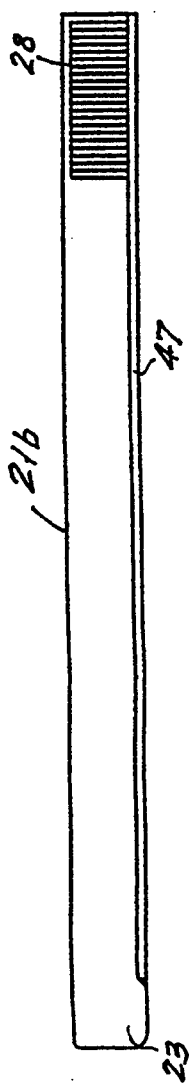
FIG. 21 is a side view of the assembled base and lid taken from line L—L of FIG. 16.
Figure 22:
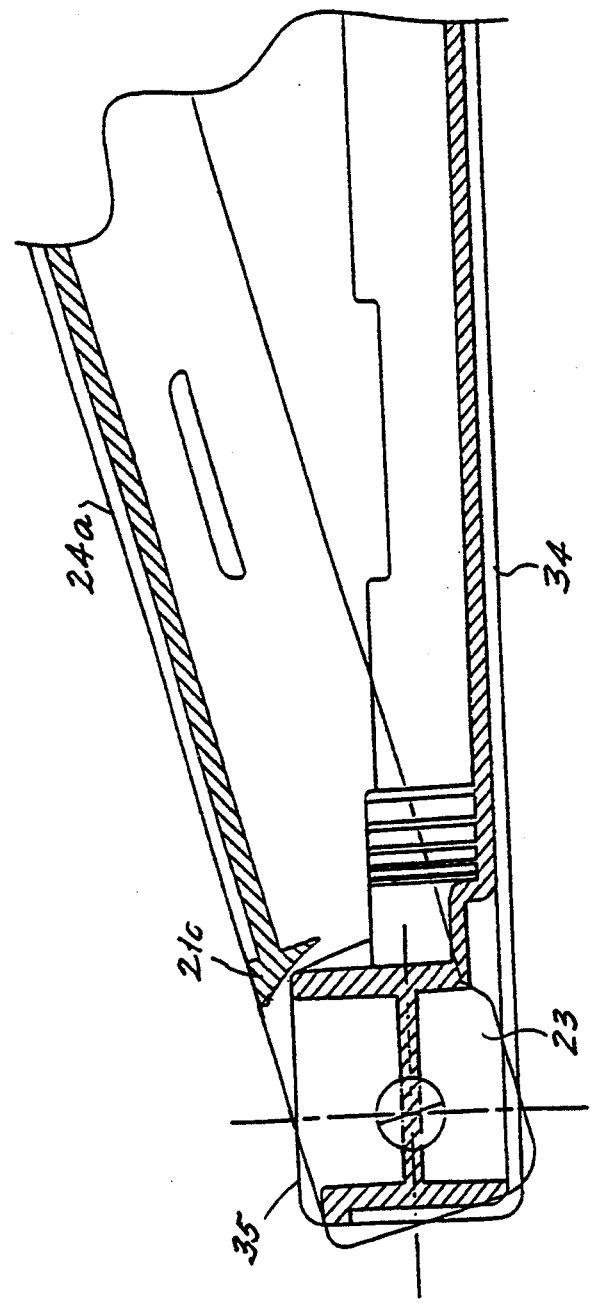
FIG. 22 is a side view of a cross-section of the assembled base and lid in a partially opened orientation.

Referring to FIGS. 9–14, sidewall 21 of lid 20 is formed of segments 21a, 21b, 21c and 21d. When the base and lid are closed, lid sidewall segments 21a and 21b mate with rims 47 and 48 of base 30, as shown in FIGS. 17, 20 and 21, and lid sidewall segment 21d mates with base sidewall segment 31c, to provide rigidity to the container structure. Lid sidewall segment 21c is angled to provide clearance around the wall of hinge 35 during opening and closing of the container, see FIG. 22.

Tabs 22 are mounted on the inner side of the lid sidewall segments 21a and 21b. A printed document, such as a lyric booklet, or other printed material can be slid beneath tabs 22 to secure the document between the disc and lid.

Figure 14:
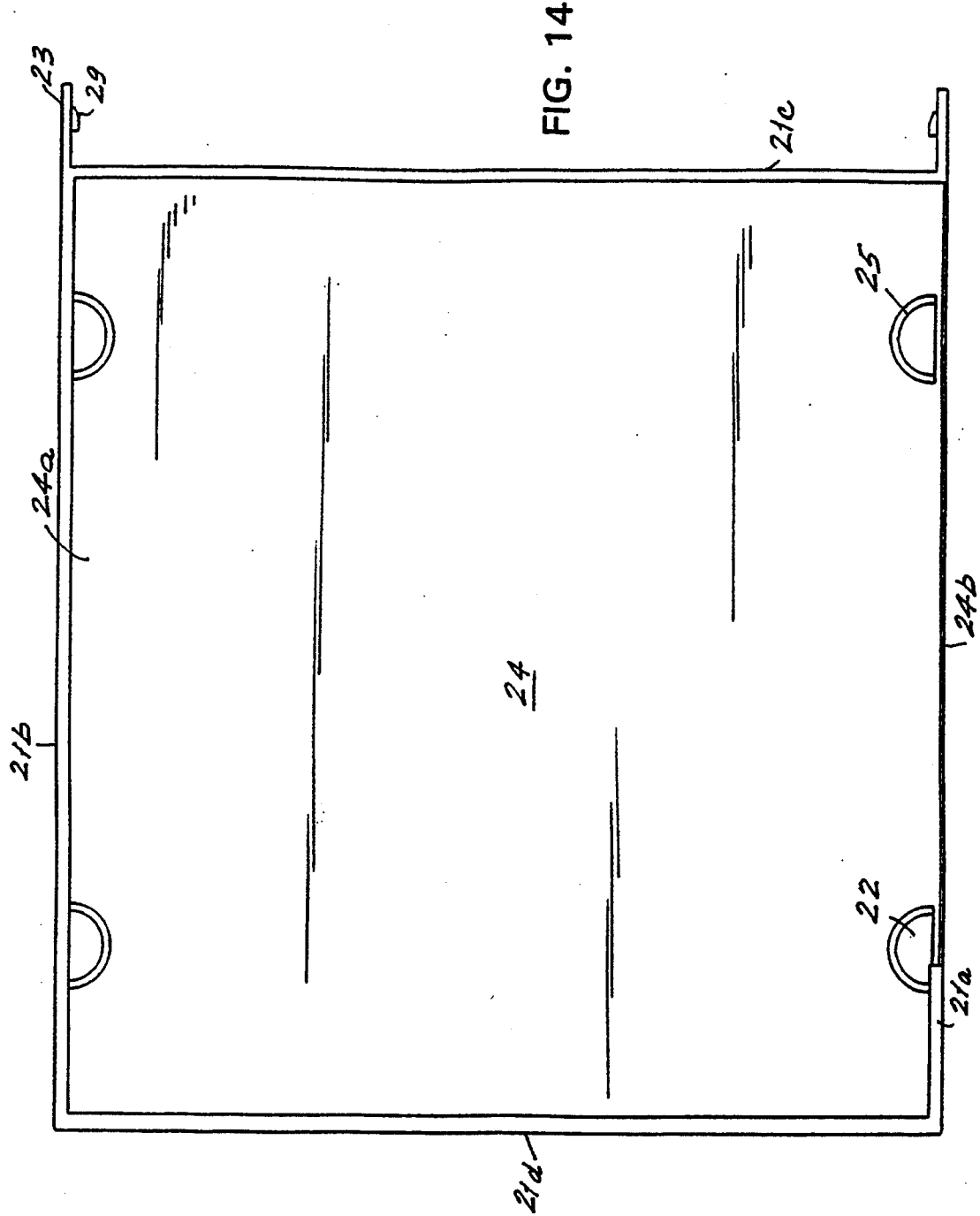
FIG. 14 is a bottom view of the lid of the container.

Lid sidewall segment 21a and 21b include extension 23, shown in FIGS. 9 and 14, which are designed to cooperate with the spine of the base to form part of hinge 35. Sidewall extensions 23 include pins 29 which can be slid through indents 43 in base 30 (see FIG. 5) and engaged in apertures 42 of hinge 35 (see FIG. 7).

Figure 10:
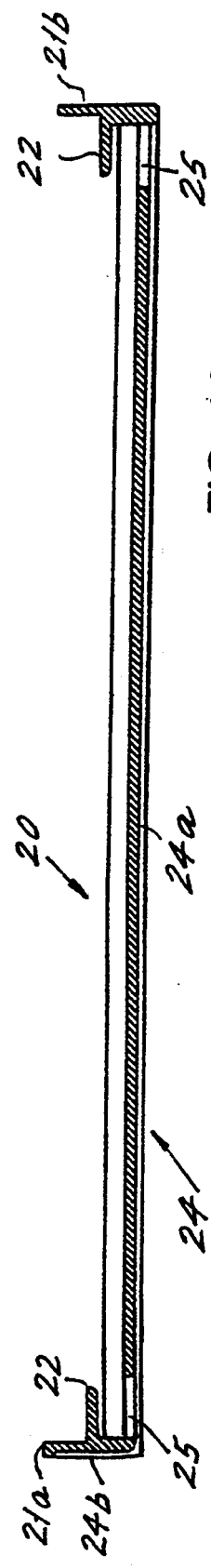
FIG. 10 is a cross-section of the lid of the container taken along line D—D of FIG. 9.

FIG. 10 is a cross-section of lid 20 taken along line D—D of FIG. 9. Lid 20 includes cut-outs 25 in the vicinity of each of the tabs 22. Like sidewall 31 of base 30, sidewall 21 extends above the inner and outer surfaces of base panel 30a. As shown in FIGS. 10 and 14, the outer surface 24 of the lid includes a recessed area 24a with respect to sidewall 21.

The first sheet of paperboard 40 is adhered within recess 24a. Lid 20 includes a recessed section 24b along sidewall segment 21a. The top portion 45 of sheet 40 is designed to be wrapped over sidewall segment 21a and adhered within recessed section 24b, as shown in FIG. 12.

Figure 11:
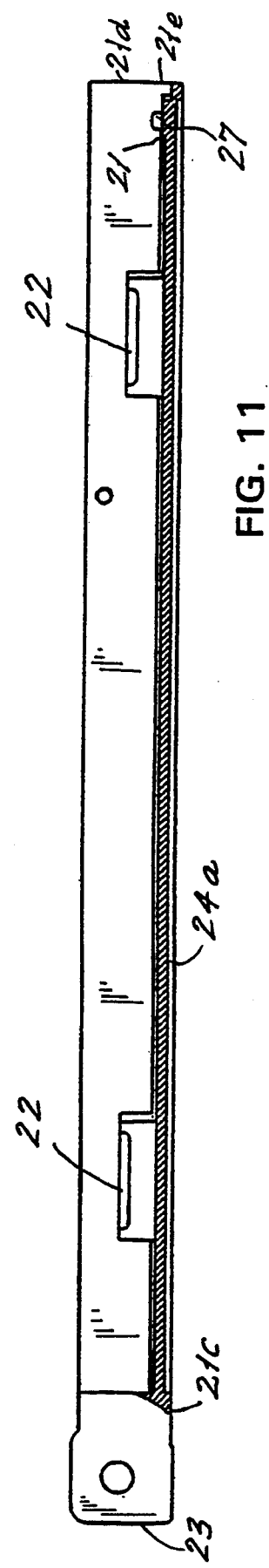
FIG. 11 is a cross-section of the lid along line F—F of FIG. 9.

As shown in FIG. 11, at lid sidewall segment 21d, lid 20 includes a step 21e. When the lid and base sections are closed, base sidewall segment 31c fits flush with step 21e.

Figure 12:
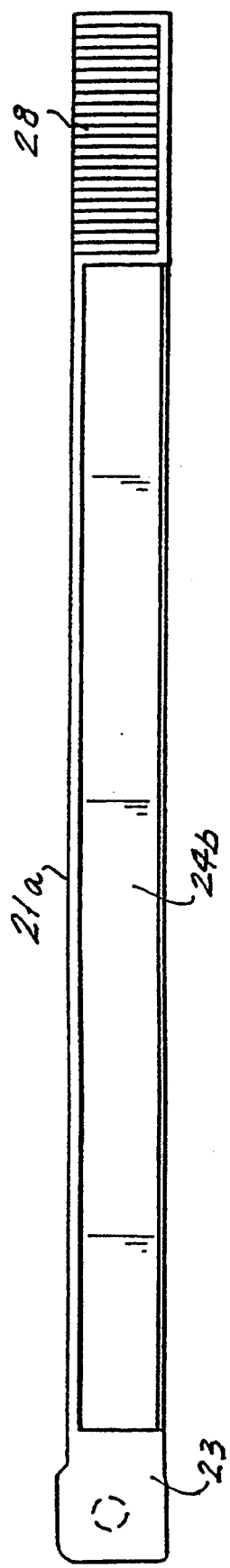
FIG. 12 is a side view of the lid taken from line E—E of FIG. 9.
Figure 13:
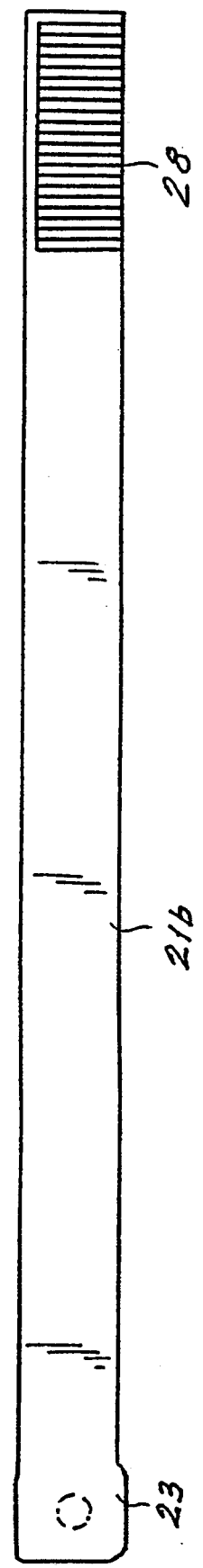
FIG. 13 is a side view of the lid taken from line H—H of FIG. 9.

FIG. 12 is a side view of lid 20 taken from line E—E of FIG. 9. Both sides of lid 20, as shown in FIGS. 12 and 13, include a notched surface 28, which provides a gripping area for the user.

Figure 15:
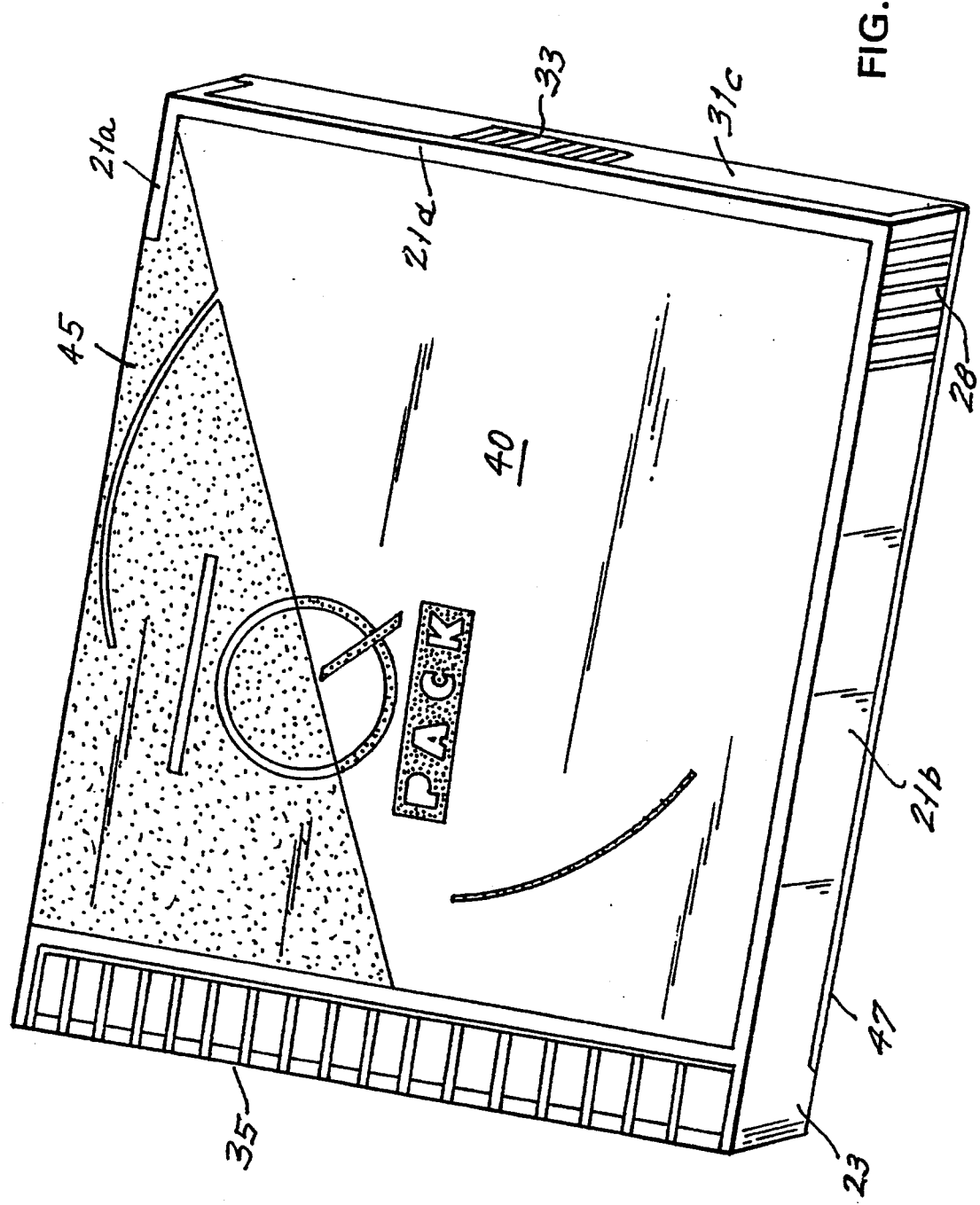
FIG. 15 is a perspective view of the assembled container of the present invention.
Figure 18:
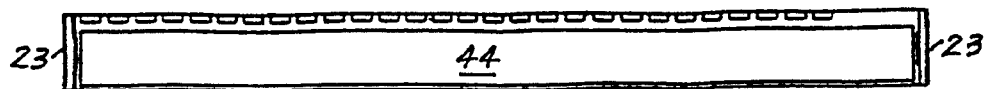
FIG. 18 is a rear view of the assembled base and lid.
Figure 16:
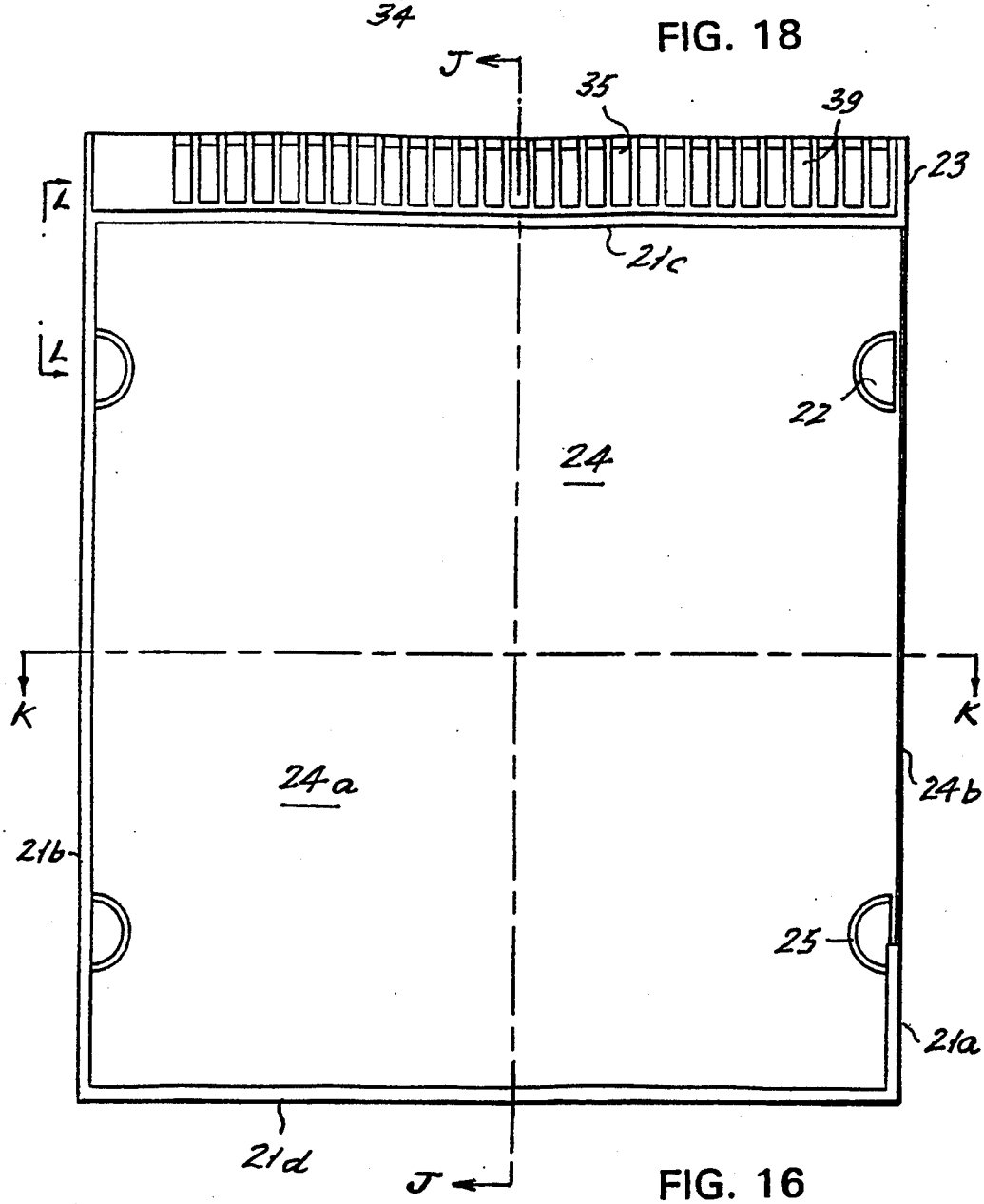
FIG. 16 is a top view of the assembled lid and base of the container without the paperboard sheets.

FIG. 15 is a perspective view of the assembled container. Paperboard sheet 40 is glued to the outer surface 24 of lid 20. Portion 45 of sheet 40 wraps around part of lid sidewall segment 21b and is glued in recess 24b.

FIGS. 23 and 24 illustrate another embodiment, wherein the package is formed with spindles 32 on the inner surfaces of both the lid and base. Thus, the package can accommodate more than a single disc. In this embodiment, the second sheet 50, which is adhered to the inner surface 26 of lid 20, includes a central aperture 75 to accommodate a second spindle 32'.

Although the container of the present invention has been described for housing a media disc, such as a compact disc, or CD ROM, the package can be designed to accommodate other items such as computer or video games, audio or video cassettes, cosmetics, books or other products.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A media disk storage container, comprising:
 a lid comprising a first panel having an inner surface and an outer surface, and a first sidewall extending at least partially around the periphery of the first panel, the outer surface of the first panel being recessed with respect to a peripheral edge of the first sidewall;
 a base comprising a second panel having an inner and an outer surface, and a second sidewall extending at least partially around the periphery of the second panel, the outer surface of the second panel being recessed with respect to a peripheral edge of the second sidewall;
 means for hingedly connecting the lid and the base together;
 a first sheet of material adhered to the recessed outer surface of the lid;
 a second sheet of material adhered to the inner surface of the lid;
 a third sheet of material adhered to the recessed outer surface of the base; and
 a fourth sheet of material adhered to the inner surface of the base;
 wherein the first, second, third and fourth sheets of material are separate from each other.

2. The container of claim 1, wherein the first, second, third and fourth sheets of material are comprised of paperboard.

3. The container of claim 2, wherein the paperboard includes printed matter.

4. The container of claim 1, wherein the base includes a recessed spine, and the third sheet of material includes a portion which extends from the outer surface of the base, wraps around to the recessed spine and is adhered therein.

5. The container of claim 1, wherein the lid includes a recessed section along an upper side of the first sidewall, and the first sheet of material includes a corresponding top portion which extends from the outer surface of the lid, wraps around the upper side of the first sidewall and is adhered within the recessed section.

6. The container of claim 1, further comprising means located on the inner surface of the lid for securing a document to be included in the container.

7. The container of claim 1, further comprising a spindle located on the inner surface of the base for securing a media disk within the container.

8. The container of claim 1, further comprising a first spindle located on the inner surface of the base and a second spindle located on the inner surface of the lid for securing a plurality of media disks within the container.

9. The container of claim 1, further comprising an anti-theft device concealed within the container.

10. The container of claim 9, wherein the anti-theft device is located on the base between the outer surface thereof and the third sheet of material.

11. The container of claim 1, further comprising support means located on the inner surface of the base for preventing damage to the container when the lid and base are compressed together.

12. The container of claim 1, further comprising locking means for locking the base and lid together.

13. The container of claim 12, wherein the locking means comprises supports disposed on the inner surface of the base which mate with bosses disposed on the inner surface of the lid when the base and lid are closed together.

14. The container of claim 1, further comprising grasping means located on both the first and second peripheral walls for enabling a user to grasp the base and lid when opening or closing the container.

15. The container of claim 14, wherein the grasping means comprise notched surfaces on the first and second sidewalls.

16. The container of claim 1, further comprising means disposed on the sidewalls of the lid and the base which mate when the container is closed for providing rigidity to the container.

* * * * *